United States Patent [19]

Johnson et al.

[11] Patent Number: 5,293,608
[45] Date of Patent: Mar. 8, 1994

[54] SYSTEM AND METHOD FOR OPTIMIZING CACHE MEMORY UTILIZATION BY SELECTIVELY INHIBITING LOADING OF DATA

[75] Inventors: Paul A. Johnson, Allison Park; Thomas W. Ryan, Valencia, both of Pa.

[73] Assignee: Legent Corporation, Pittsburgh, Pa.

[21] Appl. No.: 688,189

[22] Filed: Apr. 19, 1991

[51] Int. Cl.[5] .......................................... G06F 12/08
[52] U.S. Cl. ............................ 395/425; 364/DIG. 1; 364/243.4; 364/964.2
[58] Field of Search ... 364/200 MS File, 900 MS File; 395/425

[56] References Cited

U.S. PATENT DOCUMENTS

| | | | |
|---|---|---|---|
| 4,463,424 | 7/1984 | Mattson et al. | 395/425 |
| 4,467,411 | 8/1984 | Fry et al. | 395/250 |
| 4,530,055 | 7/1985 | Hamstra et al. | 395/425 |
| 4,636,946 | 1/1987 | Hartung et al. | 395/425 |
| 4,648,033 | 3/1987 | Lewis et al. | 395/400 |
| 4,797,814 | 1/1989 | Brenza | 395/425 |
| 4,811,203 | 3/1989 | Hamstra | 395/425 |
| 4,905,141 | 2/1990 | Brenza | 395/425 |
| 4,920,478 | 4/1990 | Furuya et al. | 395/425 |

OTHER PUBLICATIONS

IBM Programming Announcement dated Oct. 3, 1989 p. 1-2.

*Primary Examiner*—Joseph L. Dixon
*Assistant Examiner*—Matthew Kim
*Attorney, Agent, or Firm*—Kirkpatrick & Lockhart

[57] ABSTRACT

A system and method for optimizing the utilization of a cache memory in an input/output controller in a computer system which also includes a central processing unit and a plurality of direct access storage devices. The optimizing system calculates a demotion time where the demotion time is an approximation of the length of time that a track of data will reside in the cache memory in the input/output controller after its last input/output request from the central processing unit. The optimizing system further intercepts an input/output request from the central processing unit for a requested track of data, determines an elapsed time between successive input/output requests from the central processing unit for the requested track of data, determines whether the elapsed time is greater than the demotion time and optimizes the requested track of data by inhibiting the requested track of data from being loaded into the cache memory if the elapsed time is greater than the demotion time.

14 Claims, 4 Drawing Sheets

SYSTEM AND METHOD FOR OPTIMIZING CACHE MEMORY UTILIZATION BY SELECTIVELY INHIBITING LOADING OF DATA

BACKGROUND OF THE INVENTION

1. Field of the Invention

The present invention is directed generally to a system and method for optimizing the utilization of computer hardware and more specifically to a system and method for optimizing the utilization of a cache memory.

2. Description of the Background of the Invention

Large mainframe computer systems generally include, along with various other pieces of equipment, a central processing unit, a number of direct access storage devices and one or more input/output controllers. Each input/output controller processes data requests from the central processing unit for those direct access storage devices which are in communication with that controller. These input/output controllers may include a cache memory which is typically smaller in size than 256 megabytes.

When an input/output controller which includes a cache memory processes an initial data request from the central processing unit for a certain track of data, the requested track of data is loaded from one of the direct access storage devices into the cache memory. Subsequent requests for that track of data, while it is stored in the cache memory, do not require the input/output controller to access the track of data on the direct access storage device. Because the central processing unit's access time for data residing in the cache memory is much less than the access time for data residing on one of the direct access storage devices, the performance of the computer system is greatly improved when data requested by the central processing unit is located in the cache memory.

Because the size of the cache memory is not, however, unlimited, all of the tracks of data requested by the central processing unit cannot reside in the cache memory. Thus, the input/output controller generally utilizes an algorithm wherein data is loaded into the cache memory until it is full and then the track of data which has been least recently accessed by the central processing unit is replaced by a track of data requested by the central processing unit and not found in the cache memory.

This algorithm does not, however, result in the most efficient use of the cache memory. For example, tracks of data that are accessed less frequently than the average time that a track of data would reside in the cache memory from the last time it was accessed by the central processing unit until it is replaced by another track of data are not efficient users of cache memory. This is because there is a certain time involved in loading a track of data from the direct access storage device into the cache memory. It is only efficient to load this track of data into cache memory if it will still be in the cache memory when the central processing unit requests it the next time. Thus, cache memory efficiency could be increased if tracks of data which are not efficient cache users were inhibited from being loaded into cache memory thereby displacing potentially more efficient users of cache memory. Unfortunately, however, there is no direct method for calculating the length of time a track of data resides in cache memory after its last access thereby making it difficult to determine which tracks of data are not efficient cache memory users. Thus, the need exits for a system for optimizing the utilization of cache memory by determining which tracks of data are not efficient cache memory users and inhibiting those tracks from being loaded into the cache memory.

SUMMARY OF THE INVENTION

The present invention is directed to a system for optimizing the utilization of a cache memory in an input/output controller. This input/output controller processes an input/output request from a central processing unit, determines whether the requested track of data resides in the cache memory or on one of a plurality of data storage devices in communication with the input/output controller and causes the requested track of data to replace the track of data in the cache memory least recently accessed by the central processing unit if the requested track of data does not already reside in the cache memory.

The optimizing system calculates a demotion time where the demotion time is an approximation of the length of time that each track of data will reside in the cache memory after its last input/output request from the central processing unit. The optimizing system further intercepts an input/output request from the central processing unit for a requested track of data, determines an elapsed time between successive input/output requests from the central processing unit for the requested track of data, determines whether the elapsed time is greater than the demotion time and optimizes the requested track of data by inhibiting the requested track of data from being loaded into cache memory if the elapsed time is greater than the demotion time.

The present invention is further directed to a method for optimizing the utilization of a cache memory in an input/output controller where the input/output controller functions as is described in relation to the optimizing system set forth above. The optimizing method includes the steps of intercepting an input/output request from the central processing unit for a requested track of data before the input/output request is processed by the input/output controller and inhibiting the requested track of data from being loaded into the cache memory from one of the plurality of direct access storage devices if an optimization flag is set in an entry for the requested track of data in a current tracks list. The method further includes the steps of intercepting the input/output request after the input/output request has been processed by the input/output controller, creating the entry for the requested track of data in the current tracks list if the entry does not already exist, calculating an elapsed time between the input/output request and an immediately preceding input/output request for the requested track of data from the central processing unit and comparing said elapsed time to the demotion time which is defined as described above. The steps of the method also include the steps of adjusting the demotion time based on the location of the requested track of data for each request and a relationship between the elapsed time and the demotion time, setting the optimization flag in the entry for the requested track of data if certain criteria are met and deleting the entry for the requested track of data in the current tracks list if the entry was found in the current tracks list for two successive input/output requests and the optimization flag has not been set.

The system and method of the present invention for optimizing the utilization of a cache memory in an input/output controller provide the means for optimizing the utilization of a cache memory by determining which tracks of data are not efficient cache memory users and inhibiting those tracks from being loaded into the cache memory. These and other advantages and benefits of the present invention will become apparent from the description of a preferred embodiment hereinbelow.

BRIEF DESCRIPTION OF THE DRAWINGS

For the present invention to be clearly understood and readily practiced, a preferred embodiment will now be described, by way of example only, with reference to the accompanying figures wherein.

DETAILED DESCRIPTION OF THE PREFERRED EMBODIMENT

Figure 1:
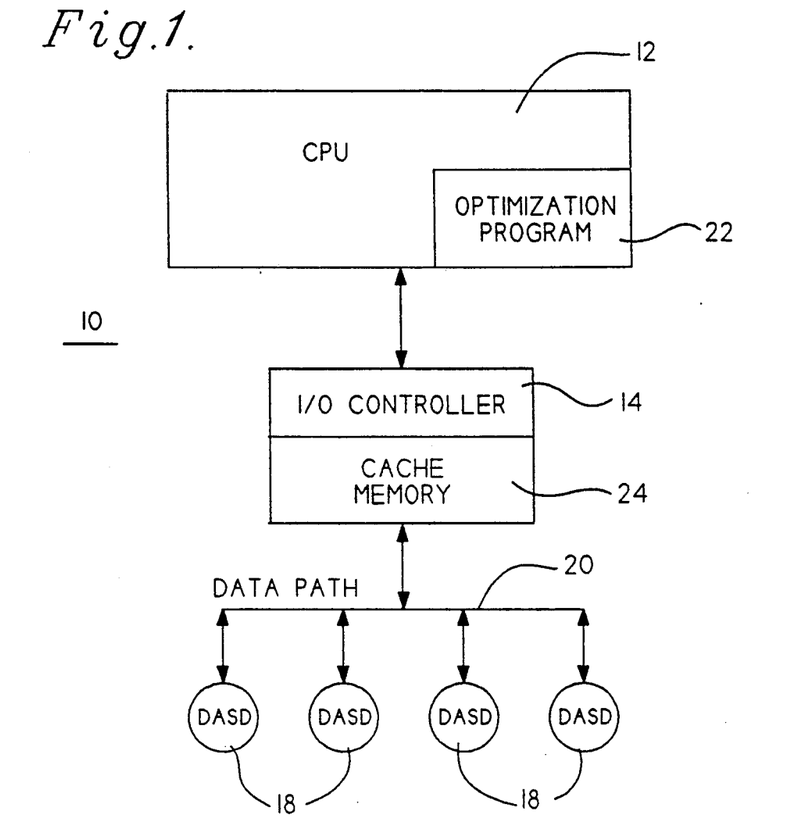
FIG. 1 illustrates a typical computer system in which the system and method of the present invention can be employed.

FIG. 1 illustrates a simplified representation of a typical computer system 10 in which the system and method of the present invention for optimizing the utilization of cache memory may be employed. A central processing unit 12 is connected to an input/output controller 14 by data path 16. Data can be transmitted both from the central processing unit 12 to the input/output controller 14 and from the input/output controller 14 to the central processing unit 12 over the data path 16. The input/output controller 14 may include a cache memory 24 which is typically smaller in size than 256 megabytes. The input/output controller 14 is in communication with a plurality of direct access storage devices 18 via data path 20. As with data path 16, data can be transmitted via data path 20 both from the direct access storage devices 18 to the input/output controller 14 and from the input/output controller 14 to the direct access storage devices 18.

One of ordinary skill in the art will recognize that any number of direct access storage devices 18 may be connected to input/output controller 14 up to a maximum number which depends upon the capacity of the controller 14. Similarly, any number of input/output controllers 14 can be connected to central processing unit 12 depending upon the capacity of central processing unit 12. Also, more than one central processing unit 12 may be connected to any one input/output controller 14.

The central processing unit 12 may perform various functions including arithmetic operations, control instruction processing and initiation of input/output requests for data. An input/output request may direct data to be loaded into the main memory (not shown) of the central processing unit 12 or for data stored in the main memory (not shown) of the central processing unit 12 to be written to one of the direct access storage devices 18. Every input/output request from the central processing unit 12 is first transmitted for processing to the input/output controller 14 over data path 16.

In normal operation, the input/output controller 14 determines whether a track of data requested by the central processing unit 12 is stored in the cache memory 24. If the requested track of data is stored in the cache memory 24, the input/output controller 14 transmits this track of data to the central processing unit 12 over data path 16. If the requested track of data is not stored in the cache memory 24, the input/output controller 14 loads the track of data from the direct access storage device 18 on which it resides into the cache memory 24. The loaded track of data is then transmitted to the central processing unit 12 over data path 16. Alternately, the input/output controller 14 may cause the track of data stored on one of the direct access storage devices 18 to be transmitted directly to the central processing unit 12 completely bypassing the cache memory 24.

The input/output controller 14 continues to load tracks of data into the cache memory 24 until it is full. After the cache memory 24 is full, the algorithm generally used by the input/output controller 14 replaces the track of data least recently accessed by the central processing unit 12 with newly loaded data. This newly loaded data occupies the logical first position in the cache memory 24. When any track of data is accessed by the central processing unit 12, it is moved to the logical first position in the cache memory 24. As a result, the least recently used track of data will always occupy the logical last position in the cache memory 24.

The optimization system and method of the present invention enhances the operation of such input/output controller 14 algorithms by inhibiting tracks of data that are inefficient cache memory 24 users from being loaded into the cache memory 24 thereby optimizing cache memory 24 use. The optimization system and method will be explained through the use of the flow charts illustrated in FIGS. 2a through 2c. These flow charts illustrate the steps performed by optimization program 22 which is stored within the central processing unit 12 of FIG. 1 and is designed to implement the system and method of the present invention. One of ordinary skill in the art will recognize that the program steps illustrated in the flow chart of FIG. 2c will be executed prior to the program steps illustrated in the flow charts of FIGS. 2a and 2b. However, for explanation purposes, the program steps illustrated in FIGS. 2a and 2b will be discussed first.

Figure 2A:
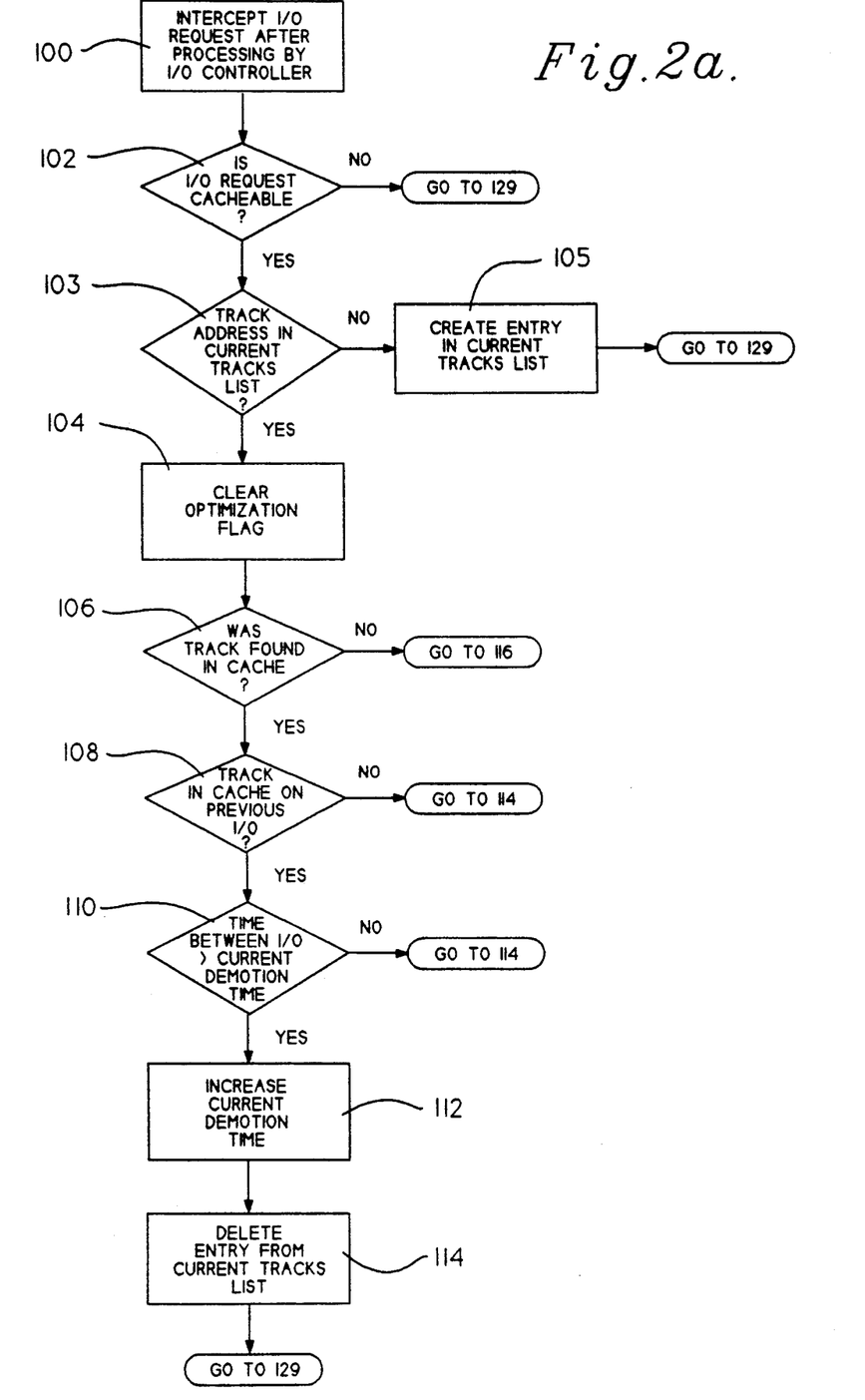
FIGS. 2a through 2c depict flow charts illustrating the steps performed by an optimization program which implements the system and method of the present invention.

Optimization program 22 begins at step 100 where an input/output request for a track of data from the central processing unit 12 is intercepted after it has been processed by input/output controller 14. Program control continues with step 102 where optimization program 22 determines whether the input/output request that has just been processed is of a type that could have caused a track of data to be loaded from one of the direct access storage devices 18 into cache memory 24. For example, a write request, depending upon the particular computer system 10 on which the system and method of the present invention is implemented, may or may not be an input/output request that would cause a track of data to be loaded into cache memory 24. If optimization program 22 determines, in step 102, that the intercepted input/output request is not of a type which would cause a track of data to be loaded into cache memory 24, program control is transferred to step 129 where the optimization program 22 is terminated and the intercepted input/output request is completed.

If the optimization program 22 determines, in step 102, that the intercepted input/output request was of a type which could cause a track of data to be loaded into the cache memory 24, program control continues with step 103 where the optimization program 24 determines whether the logical address of the requested track of data stored on one of the direct access storage devices 18 is located in a current tracks list 30 (FIG. 3) for the cache memory 24. Each entry 32 in the current tracks list 30 consists of a logical track address 34, a last access time 36 which is the time the track of data stored at the track address 34 was last accessed by the central processing unit 12 and an optimization flag 38. The function of the last access time 36 and the optimization flag 38 will be discussed more fully below. A current tracks list 30 is maintained by the optimization program 22 for each cache memory 24 found in the computer system 10.

Figure 3:
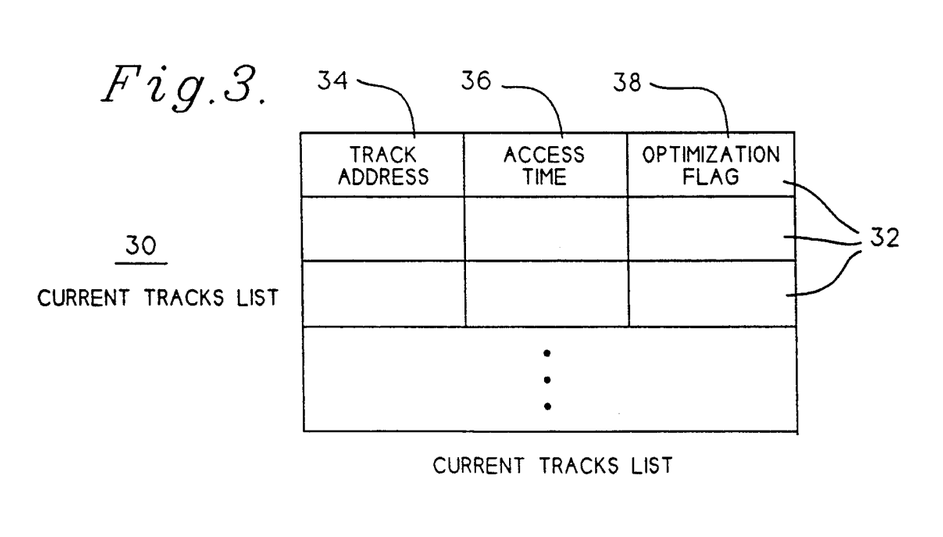
FIG. 3 illustrates a current tracks list for use in conjunction with the system and method of the present invention.

If the address for the requested track of data is not found in the current tracks list 30, an entry 32 is created in step 105 for the requested track of data at the logical first position in the current tracks list 30. Program control is then transferred to step 129 where the optimization program 22 is terminated and the input/output process is completed. If the track address is found in the current tracks list 30 in step 103, program control continues with step 104 where the optimization flag 38 in the entry 32 for the requested track of data in the current tracts list 30 is cleared to a logical zero. Program control then continues with step 106 where the optimization program 22 determines whether the requested track of data was located in cache memory 24. This determination is made by examining the time that was required to process the intercepted input/output request. An input/output request for a track of data stored in cache memory 24 requires approximately 6 msec to complete whereas an input/output request for data not stored in cache memory 24 requires approximately 24 msec to complete. An operating system (not shown) used by the central processing unit 12 to initiate the input/output request will generally compute the elapsed time required for completion of the input/output request. If the operating system does not perform this function, the optimization program 22 can be adapted to measure the elapsed time to complete the input/output request by storing the current time when the input/output request is initiated and then storing the current time when the input/output request has been intercepted. The difference between these two times is computed to determine the time required to process the input/output request.

If the optimization program 22 determines in step 106 that the requested track of data was found in the cache memory 24, program control continues with step 108; otherwise, program control continues with step 116. In step 108, the optimization program 22 determines whether the immediately preceding input/output request for the same track of data requested in the intercepted input/output request was found in the cache memory 24. The immediately preceding input/output request for the same track of data was found in cache memory 24 if the address for the requested track of data is found in an entry 32 in the current tracks list 30 on the intercepted input/output request and the optimization flag 38 is not set equal to a logical one. If the optimization program 22 determines in step 108 that the requested track of data was not found in the cache memory 24 on the immediately preceding input/output request, program control is transferred to step 114; otherwise, program control continues with step 110.

In step 110, the optimization program 22 calculates the time between successive input/output requests to the requested track of data. This time is calculated by subtracting the access time 36 stored in the entry 32 for the requested track of data in the current tracks list 30 from the current time. Because the requested track of data was found in the cache memory 24 on two successive input/output requests, this calculated time represents the minimum time that a track of data can be expected to continue to reside in the cache memory 24. The calculated time is then compared to a current demotion time. The current demotion time represents the length of time a track of data can be expected to reside in the cache memory 24 after the track of data has last been requested by the central processing unit 12. The current demotion time is initialized to zero when the optimization program 22 is executed for the first time. The demotion time is then adjusted as will be more fully described below. If the calculated time is greater than the current demotion time, program control continues with step 112 where the current demotion time is adjusted according to the following equation:

$$\text{increment} = \frac{\text{calculated time} - \text{current demotion time}}{2}$$

new current demotion time = current demotion time + increment.

Program control then continues with step 114.

If the time calculated in step 110 is not greater than the current demotion time, program control continues with step 114. In step 114, the entry 32 for the requested track of data is deleted from the current tracks list 30. Program control is then transferred to step 129 where the optimization program 22 is terminated and the input/output request is completed.

Figure 2B:
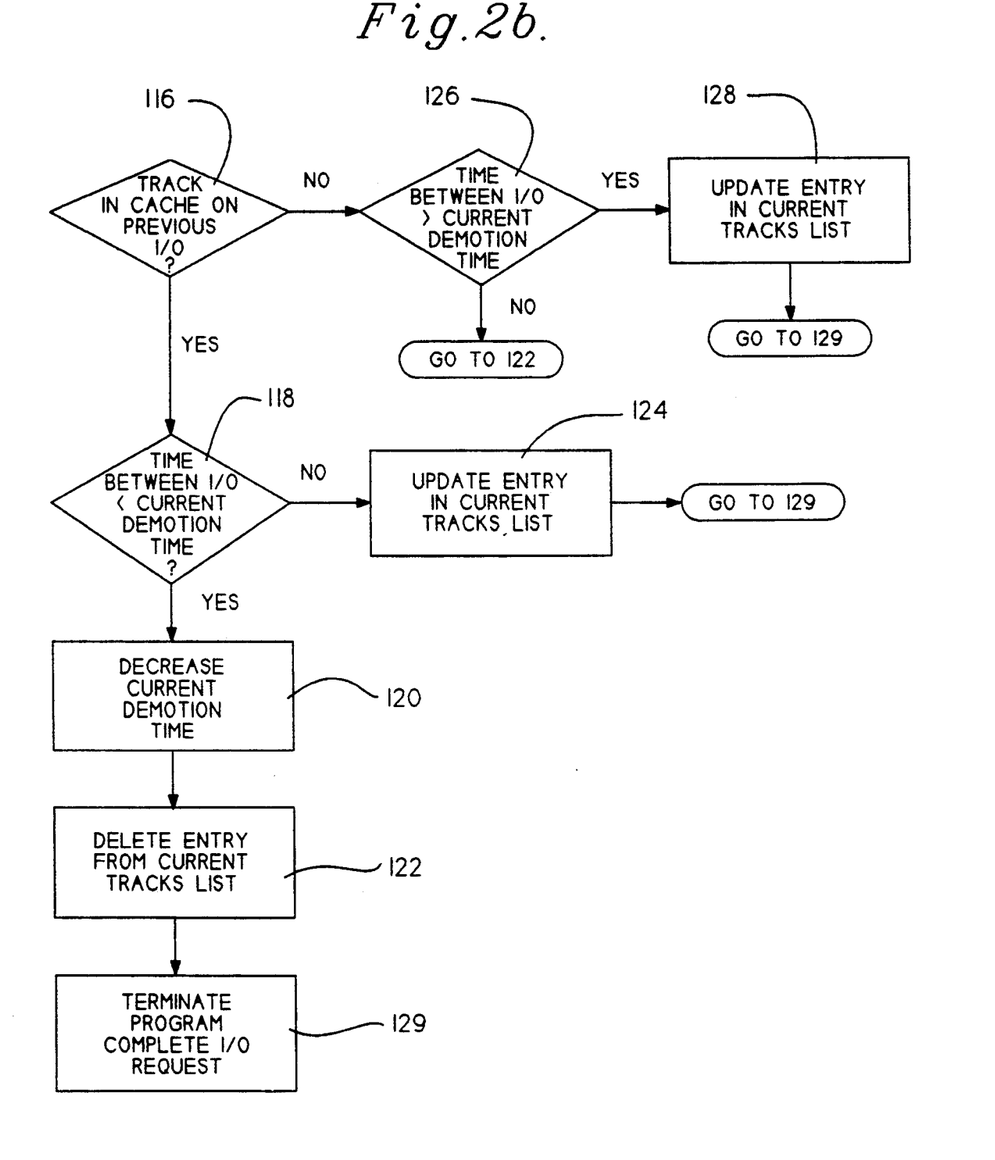

In step 116, the optimization program 22 determines whether the requested track of data was found in the cache memory 24 on the input/output request immediately preceding the intercepted input/output request for the requested track of data using the same technique described in relation to step 108 above. If the optimization program 22 determines in step 116 that the requested track of data was found in the cache memory 24 on the previous input/output request, program control continues with step 118; otherwise, program control continues with step 126. The optimization program 22, in step 118, calculates the time between successive input/output requests to the requested track of data as in step 110. If the time between successive input/output requests is less than the current demotion time, program control continues with step 122 where the current demotion time is adjusted using the following equation:

$$\text{decrement} = \frac{\text{current demotion time} - \text{calculated time}}{2}$$

new demotion time = current demotion time − decrement.

Program control then continues with step 122 where the entry 32 for the requested track of data is deleted from the current tracks list 30. Program control then continues with step 129 where the optimization program 22 is terminated and the input/output request is completed.

If the optimization program 22 determines in step 118 that the time between successive input/output requests is not less than the current demotion time, program control continues with step 124 where the optimization flag 38 in the entry 32 for the requested track of data in the current tracks list 30 is set to a logical one. The entry 32 for the requested track of data in the current tracks 30 is also moved to the logical top of the current tracks list 30. Program control then continues with step 129 where the optimization program 22 is terminated and the input/output request is completed.

In step 126, the time between successive input/output requests to the requested track of data is calculated as in step 110. If the time between successive input/output requests is greater than the current demotion time, program control continues with step 128; otherwise, program control continues with step 122 where the entry 32 for the requested track of data is deleted from the current track list 30. Program control is then transferred to step 129 where the optimization program 22 is terminated and the input/output request is completed. In step 128, the optimization flag 38 in the entry 32 for the requested track of data in the current tracks list 30 is set to a logical one as is done in step 124. The entry 32 for the requested track of data in the current tracks list 30 is also moved to the logical top of the current tracks list 30. Program control then continues with step 129 where the optimization program 22 is terminated and the input/output request is completed.

Figure 2C:
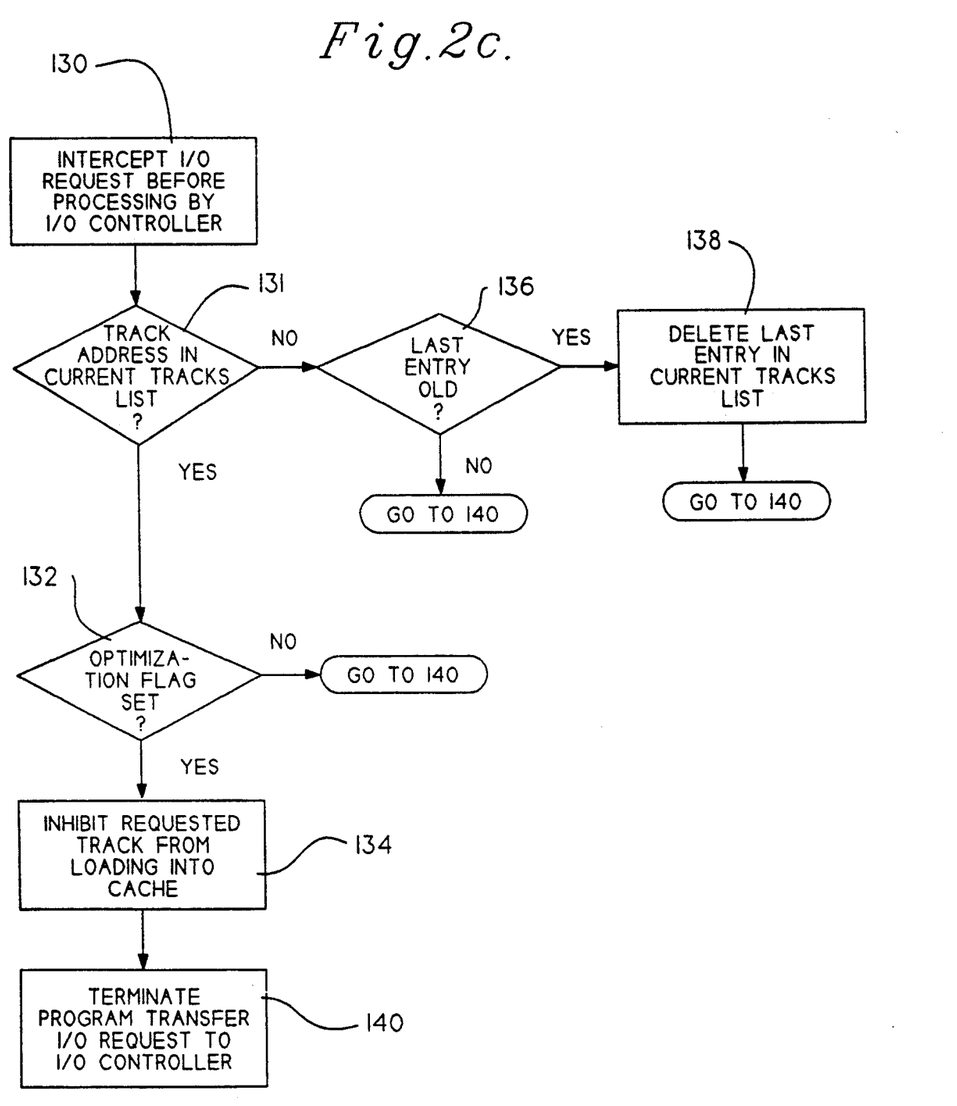

The optimization program 22 also acts, in step 130, to intercept an input/output request from the central processing unit 12 before it is processed by the input/output controller 14. In step 131, the optimization program 22 determines whether the logical address of the track of data requested by the central processing unit 12 is located in the current tracks list 30. If the address for the requested track of data is not located in the current tracks list 30, program control continues with step 136 where the optimization program 22 determines whether the entry 32 at the logical bottom of the current tracks list 30 has been in the current tracks list 30 longer than twice the demotion time. This determination is made by calculating the difference between the current time and the access time 36 stored in the entry 32 at the logical bottom of the current tracks list 30 and comparing this calculated time to the current demotion time. If the entry 32 has been in the current tracks list 30 longer than twice the current demotion time, it is deleted from the current tracks list 30 in step 138. This action by the optimization program 22 serves to clear unused entries 32 from the current tracks list 30 for tracks of data that have not recently been requested by the control processing unit 12. Either following step 136 or step 138, program control continues with step 140 where the optimization program 22 is terminated and the intercepted input/output request is transferred back to the input/output controller 14 for processing.

If the address of the requested track of data is located in the current tracks list 30 in step 130, program control continues with step 132 where the optimization program 22 determines whether the optimization flag 38 in the entry 32 for the requested track of data in the current tracks list 30 is set to a logical one If the optimization flag 38 is not set, program control continues with step 140. If the optimization flag 38 is set, program control continues with step 134 where the requested track of data is inhibited from being loaded into the cache memory 24. The manner in which this inhibiting is accomplished depends upon the design of the input/output controller 14 of the computer system 10 on which the system and method of the present invention is implemented. Generally, the operating system (not shown) will include a mechanism for inhibiting the input/output controller 14 from loading tracks of data into the cache memory 24. Program control then continues with step 140. In step 140, the optimization program 22 is terminated and the input/output request is transferred back to the input/output controller 14 for processing.

While the present invention has been described in connection with an exemplary embodiment thereof, it will be understood that many modifications and variations will be readily apparent to those of ordinary skill in the art. This disclosure and the following claims are intended to cover all such modifications and variations.

We claim:

1. A system for optimizing the utilization of a cache memory in a direct access storage device controller wherein the direct access storage device controller processes a direct access storage device request from a central processing unit for a track of data, determines whether the requested track of data resides in the cache memory or on one of a plurality of data storage devices in communication with the direct access storage device controller, and causes the requested track of data to replace the track of data in the cache memory least recently accessed by the central processing unit if the requested track of data does not already reside in the cache memory, said optimizing system comprising:

means for calculating a demotion time wherein said demotion time is an estimation of a length of time that any particular track of data will reside in the cache memory after a last direct access storage device request from the central processing unit for that track of data;

means for intercepting a direct access storage device request from the central processing unit for a requested track of data;

means, responsive to said means for intercepting, for determining an elapsed time between an initiation of successive direct access storage device requests from the central processing unit for said requested track of data;

means, responsive to said means for determining an elapsed time, for determining whether said elapsed time is greater than said demotion time; and means, responsive to said means for determining whether said elapsed time is greater than said demotion time, for optimizing said requested track of data by inhibiting said requested track of data from being loaded into cache memory if said elapsed time is greater than said demotion time.

2. The system of claim 1 wherein said means for optimizing includes means for maintaining a current list of data tracks wherein each entry in said current list includes a logical address of a track of data, a time of the last direct access storage device request from the central processing unit for said track of data and an optimization flag.

3. The system of claim 2 wherein said means for calculating said demotion time includes means for determining (a) whether said requested track of data was found in the cache memory on a first direct access storage device request from the central processing unit; and (b) whether said requested track of data was found in the cache memory on a second direct access storage device request from the central processing unit.

4. The system of claim 3 wherein said means for calculating said demotion time increases said demotion time if said first direct access storage device request was found in the cache memory, said second direct access storage device request was found in the cache memory and said elapsed time is greater than said demotion time.

5. The system of claim 4 where said means for calculating said demotion time increases said demotion time by adding to said demotion time one-half of a difference between said demotion time and said elapsed time.

6. The system of claim 4 wherein said means for calculating said demotion time decreases said demotion time if said first direct access storage device request was found in the cache memory, said second direct access storage device request was not found in the cache memory and said elapsed time is less than said demotion time.

7. The system of claim 6 wherein said means for calculating said demotion time decreases said demotion time by subtracting from said demotion time one-half of a difference between said elapsed time and said demotion time.

8. The system of claim 3 wherein said means for maintaining said current list includes means for creating an entry in said current list for said requested track of data if an address of said requested track of data is not found in said current list.

9. The system of claim 8 wherein said means for maintaining said current list includes means for deleting an entry in said current list if said address of said requested track of data was found in said current list for two successive direct access storage device requests and said requested track of data has not been optimized.

10. The system of claim 9 wherein said means for optimizing said requested track of data includes means for setting said optimization flag for said requested track of data in said current list if said requested track of data was not found in the cache memory on a second direct access storage device request from the central processing unit and said elapsed time is greater than said demotion time and means for moving said entry for said requested track of data in said current list to a logical first position in said current list.

11. The system of claim 10 wherein said means for optimizing said requested track of data includes means for determining whether said entry for said requested track of data is found in said current list and said optimizing flag is set.

12. The system of claim 9 wherein said means for maintaining said current list deletes an entry at a logical last position of said current list if said entry has been in said current list longer than twice said demotion time.

13. A method for optimizing the utilization of a cache memory in a direct access storage device controller wherein the direct access storage device controller processes a direct access storage device request from a central processing unit for a track of data, determines whether the requested track of data resides in the cache memory or on one of a plurality of data storage devices in communication with the direct access storage device controller, and causes the requested track of data to replace the track of data in the cache memory least recently accessed by the central processing unit if the requested track of data does not already reside in the cache memory, said method comprising the steps of:

intercepting a direct access storage device request from the central processing unit for a requested track of data before said direct access storage device request is processed by the direct access storage device controller;

inhibiting said requested track of data from being loaded into the cache memory from one of the plurality of direct access storage devices if an optimization flag is set in an entry for said requested track of data in a current tracks list;

intercepting said direct access storage device request after said direct access storage device request has been processed by the direct access storage device controller;

creating said entry for said requested track of data in said current tracks list if said entry does not already exist;

calculating an elapsed time between an initiation of said direct access storage device request and an initiation of an immediately preceding direct access storage device request for said requested track of data from the central processing unit;

comparing said elapsed time to a demotion time which is an estimation of the length of time that any particular track of data will reside in the cache memory after a last direct access storage device request from the central processing unit for that track of data;

adjusting said demotion time based on the location of said request track of data for each request and a relationship between said elapsed time and said demotion time;

setting said optimization flag in said entry for said requested track of data in said current tracks list if said requested track of data was not found in the cache memory and said elapsed tim e is greater than said demotion time; and deleting said entry for said requested track of data in said current tracks list if said entry was found in said current tracks list for two successive direct access storage device requests and said optimization flag has not been set.

14. A method for optimizing the utilization of a cache memory in a direct access storage device controller wherein the direct access storage device controller processes a direct access storage device request from a central processing unit for a track of data, determines whether the requested track of data resides in the cache memory or on one of a plurality of data storage devices in communication with the direct access storage device controller, and causes the requested track of data to replace the track of data in the cache memory least recently accessed by the central processing unit if the requested track of data does not already reside in the cache memory, said method comprising the steps of:

intercepting a direct access storage device request from the central processing unit for a requested track of data before said direct access storage device request is processed by the direct access storage device controller;

determining whether an entry for said requested track of data exists in a current tracks list;

determining whether an optimization flag is set in said entry for said requested track of data if said entry exists in said current tracks list;

inhibiting said requested track of data from being loaded into the cache memory from one of the plurality of direct access storage devices if said optimization flag is set in said entry for said requested track of data in said current tracks list;

intercepting said direct access storage device request after said direct access storage device request has been processed by the direct access storage device controller;

creating said entry for said requested track of data in said current tracks list if said entry does not already exist;

determining whether said requested track of data was found in the cache memory;

determining whether said requested track of data was found in the cache memory on an immediately preceding direct access storage device request for said track of data from the central processing unit;

calculating an elapsed time between an initiation of said direct access storage device request and an initiation of an immediately preceding direct access storage device request for said requested track of data from the central processing unit;

comparing said elapsed time to a demotion time which is an approximation of the length of time that any particular track of data will reside in the cache memory after a last direct access storage device request from the central processing unit for that track of data;

increasing said demotion time if (a) said requested track of data was found in the cache memory; (b) said requested track of data was found in the cache memory on said immediately preceding direct access storage device request for said requested track of data; and (c) said elapsed time is greater than said demotion time;

decreasing said demotion time if (a) said requested track of data was not found in the cache memory; (b) said requested track of data was found in the cache memory on said immediately preceding direct access storage device request for said requested track of data; and (c) said elapsed time is less than said demotion time;

setting the optimization flag in said entry for said requested track of data in said current tracks list if (a) said requested track of data was not found in the cache memory; (b) said requested track of data was found in the cache memory on said immediately preceding direct access storage device request for said requested track of data; and (c) said elapsed time is greater than said demotion time; and deleting said entry for said requested tack of data in said current tracks list if said entry was found in said current tracks list for two successive direct access storage device requests and said optimization flag has not been set.

* * * * *

UNITED STATES PATENT AND TRADEMARK OFFICE
CERTIFICATE OF CORRECTION

PATENT NO. : 5,293,608
DATED : March 8, 1994
INVENTOR(S) : Paul A. Johnson and Thomas W. Ryan It is certified that error appears in the above-indentified patent and that said Letters Patent is hereby corrected as shown below:

Col. 7, line 10, before "30" insert --list--.

Col. 7, line 65, after "one" insert --.--.

Col. 10, line 36, delete "tim e" and substitute therefor --time--.

Col. 11, line 19, delete "an" and substitute therefor --said--.

Signed and Sealed this

Twenty-third Day of August, 1994

Attest:

BRUCE LEHMAN

Attesting Officer      Commissioner of Patents and Trademarks